Aug. 31, 1954

F. T. SENS 2,687,781

FRAME FOR AIR FILTERS

Filed Sept. 27, 1951

INVENTOR.
Fred T. Sens
BY
Staehli & Overman
ATTORNEYS

Patented Aug. 31, 1954

2,687,781

UNITED STATES PATENT OFFICE 2,687,781

FRAME FOR AIR FILTERS

Fred T. Sens, Newark, Ohio, assignor to Owens-Corning Fiberglas Corporation, a corporation of Delaware Application September 27, 1951, Serial No. 248,531

3 Claims. (Cl. 183—49)

This invention relates to frames for air filters of the type in which a mat of heterogeneously arranged somewhat loose fibers is mounted in a frame work and retained in generally rectilinearly shape, the filter as a whole being placed in a stream of air, for example in an air conditioning or heating plant, for the purpose of filtering dust and other foreign objects out of the air.

In my copending application Serial No. 244,120, filed August 29, 1951, there is disclosed and claimed a frame for an air filter of this type in which the structural elements of the frame consist in perforated face plates extending across the major faces of the mass of fibers and thin tough sheet material, preferably lightweight cardboard, arranged to secure, support and space the two thin perforated face plates from each other.

It is an object of the present invention to provide a lightweight sturdy side frame element for such an air filter which constitutes a simplification and improvement over the frames disclosed in my copending application and over frames such as are employed in the art in general.

It is another object of this invention to provide a frame construction for an air filter in which no mechanical attaching means is required to secure the metal grills or perforated face plates to the side frames and thus in which weight and cost of assembly are both considerably reduced over conventional prior art structures.

It is yet another object of this invention to provide a lightweight filter frame in which the side frame members, i. e., those members which space the face plates from each other are fabricated from lightweight but structurally strong corrugated elements and in which such corrugated elements are adhered the edges of the metal grills.

These particular objects will be better understood from the specification that follows and from the drawings in which.

Figure 1:
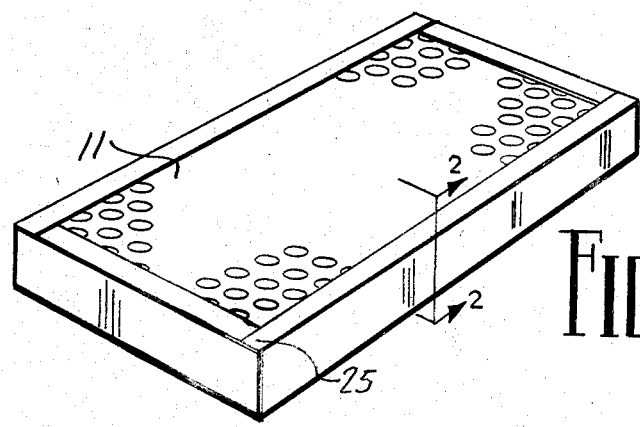
Fig. 1 is a perspective view of an air filter incorporating a frame embodying the invention.

An air filter of the type which a frame embodying the invention is designed to enclose and mount consists in a generally rectilinear mass of heterogeneously arranged fibers 10. The fibers 10 serve to catch dust, pollen and other particles and to filter the same out of the stream of air passing through the mass of fibers. The fibers 10 may be produced from rock wool, glass or similar synthetic or natural materials which can be drawn or blown or otherwise arranged in loosely compacted masses of fibers and formed in the proper shapes.

The filter consisting in the mass of fibers 10 has practically no mechanical strength and thus it is mounted between perforated face plates 11 and 12 which, in the type of filter shown in the drawings, may comprise thin sheet metal plates or grills so designed as to hold the fibers in a mass but to allow the passage of a substantially unrestricted flow of air through the fibers.

A frame for a filter embodying the invention may consist in a fold of thin fibrous material such as lightweight cardboard 13 which is folded over the edge of the upper grill 11 and secured in place thereon by a mass of adhesive 14 filling apertures 15 in the grill 11 along the edge of the grill 11 and adhering the strip of material 13 to the edge of the grill 11 and to itself. The grill 11 may be so cut as to provide for a thin web of material 16 that is buried in the fold of sheet material 13 with the adhesive 14 serving to prevent the sheet material 13 from separating from the grill 11.

A similar fold of sheet material 17 similarly is adhered along the edge of the lower grill 12.

Extending transversely to the planes of the grills or face plates 11 and 12 and adhered to the inner sides of the folded strips of sheet material 13 and 17 is a filter side wall 18 which consists in a relatively heavy, narrow strip of corrugated cardboard or similar material having an inner facing sheet 19, an outer facing sheet 20 and a corrugated bracing element 21. A coating of adhesive 22 adheres the edges of the wall 18 to inner folds 23 and 24 of the strips of sheet material 13 and 17.

The folds of the strip material 13 and 17 may be overlapped at the corners of the filter structure as indicated by the reference numeral 25 in Fig. 1 to further strengthen the frame as a unit.

Because of the extremely rigid nature of the corrugated wall 18 in resisting compression along the axis of the corrugations of the bracing element 21, the strength of the perimetrical walls of the unit as a whole is considerable. The filter frame may be assembled by first adhering the inner folds 23 and 24 of the strips 13 and 17 to opposite edges of the wall 18; then placing sheet metal grills or face plates 11 and 12 on the outside surfaces of the folds 23 and 24; and then folding the strips of sheet material 13 and 17 around the edges of the grills 11 and 12 respectively, with sufficient pressure to adhere the assembled elements to each other, the wall 18 serving satisfactorily to resist the pressure necessary to cause such adhesion.

Figure 2:
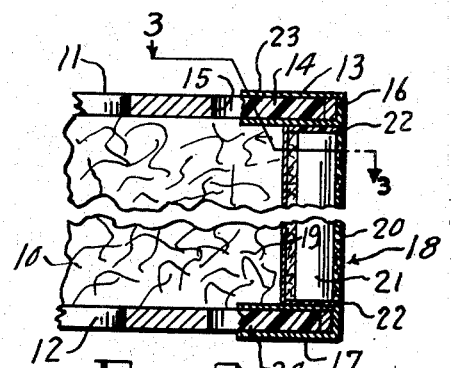
Fig. 2 is an enlarged fragmentary vertical sectional view taken substantially on the line 2—2 of Fig. 1.
Figure 3:
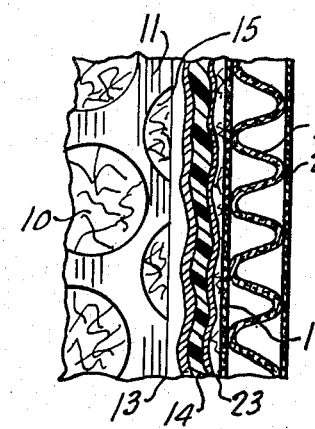
Fig. 3 is a fragmentary view partly in plan and partly in section taken along the line 3—3 of Fig. 2.
Figure 4:
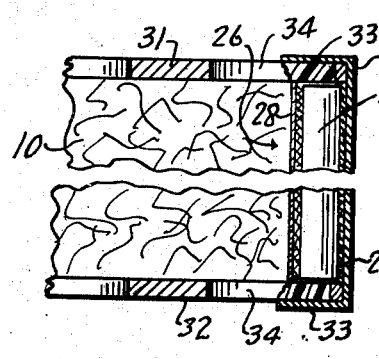
Fig. 4 is a view similar to Fig. 2 but of a modification of a side frame incorporating the invention.

In Fig. 4 there is illustrated a modified form of frame embodying the invention in which a side wall 26 consisting of a corrugated bracing element 27 and inner and outer sheet elements 28 and 29 is enfolded in a wide strip of thinner sheet material 30 that is adhered to the outside of the element 29 and extends outwardly beyond and is folded over and adhered to the upper and lower face plates or grills 31 and 32 respectively. A mass of adhesives 33 extends through apertures 34 in the grills 31 and 32 in a manner similar to that in which the adhesive 14 is used in the embodiment of the invention illustrated in Fig. 2.

The strip 30, being folded over the outside edges of the grills 31 and 32, both serves as a base for the adhesive 33 and as a decorative cover for the edge of the assembled grill structure.

The generally flat perforated face plates or grills 11 and 12 or 31 and 32 as the case might be, thus are retained in parallel shaped relationship for the retention and support of the generally loose mass of fibers 10. The cross walls 18 or 26 respectively, strengthened by the corrugated elements 21 and 27 respectively, function both to space the face plates or grills from each other and to form the side protective walls for the frame for the mass of fibers 10. The transverse strength of the walls 18 and 26, resulting from the corrugated elements therein, provides ample structural strength for the side frames without adding substantial weight to the complete filters and provides for securing the elements of the filter frame to each other without mechanical securing means such as staples, wires or clips.

A filter frame constructed according to the invention thus is light in weight, low in cost of materials required and simple to assemble.

I claim:

1. An air filter comprising a generally rectilinear mass of fibers, a frame encompassing said mass and comprising a pair of spaced parallel grilles located on opposite main faces of said mass of fibers, a transversely extending side wall located between the inner faces of said grilles about the edges thereof to space the grilles apart, and a U-shaped channel of sheet material extending along each of the four sides of said filter and received over and enclosing said side wall and the edges of both of said grilles, the flanges of said U-shaped channel being adhered to said grilles and the web of said channel being adhered to said side wall.

2. The air filter of claim 1 wherein the side wall is a corrugated element having flutings extending perpendicularly to said grilles.

3. A filter according to claim 2 in which said channel of sheet material extends only over the outer side of each of the edges of said grilles and the edges of said cross wall contact the inner sides of said grilles, and a layer of adhesive extending through perforations in said grilles between the edges of said cross wall and the said channel of sheet material.

References Cited in the file of this patent

UNITED STATES PATENTS

| Number | Name | Date |
|---|---|---|
| 2,008,751 | Davies | July 23, 1935 |
| 2,138,874 | Myers | Dec. 6, 1938 |
| 2,232,065 | Hasselwander | Feb. 18, 1941 |
| 2,459,802 | Fleisher | Jan. 25, 1949 |
| 2,569,575 | Phillips | Oct. 2, 1951 |

FOREIGN PATENTS

| Number | Country | Date |
|---|---|---|
| 482,543 | Great Britain | Mar. 31, 1938 |